(12) United States Patent
Heulitt (10) Patent No.: US 10,323,758 B2
(45) Date of Patent: Jun. 18, 2019

(54) ADJUSTABLE PRESSURE ACTUATED DIAPHRAGM VALVE ASSEMBLY

(71) Applicant: Robert G. Heulitt, Middlesex, NJ (US)

(72) Inventor: Robert G. Heulitt, Middlesex, NJ (US)

( * ) Notice: Subject to any disclaimer, the term of this patent is extended or adjusted under 35 U.S.C. 154(b) by 3 days.

(21) Appl. No.: 15/330,898

(22) Filed: Nov. 10, 2016

(65) Prior Publication Data

US 2018/0128386 A1 May 10, 2018

(51) Int. Cl.
*F16K 15/02* (2006.01)
*F16K 15/06* (2006.01)
*F16K 47/00* (2006.01)

(52) U.S. Cl.
CPC .......... *F16K 15/026* (2013.01); *F16K 15/063* (2013.01); *F16K 47/00* (2013.01)

(58) Field of Classification Search
CPC .. Y10T 137/789; Y10T 137/7886; F01L 3/10; F01L 1/462; F16K 15/063; F16K 15/026; F16K 1/385; F16K 1/38; F16K 17/044; F16K 31/1262; F16K 27/0254
USPC ........................................................ 251/331
See application file for complete search history.

(56) References Cited

U.S. PATENT DOCUMENTS

| | | | | |
|---|---|---|---|---|
| 1,519,856 A | * | 12/1924 | Lorraine | F16K 17/044 137/320 |
| 1,573,520 A | * | 2/1926 | McNab | F16K 15/063 137/533.29 |
| 2,235,924 A | * | 3/1941 | Gignoux | B23B 5/38 451/135 |
| 2,483,572 A | * | 10/1949 | Cater | F16K 15/06 137/533.23 |
| 3,995,658 A | * | 12/1976 | Hager | F16K 15/026 137/543 |
| 5,601,112 A | * | 2/1997 | Sekiya | F16K 15/148 137/512.15 |
| 2013/0074964 A1 | * | 3/2013 | Wu | F16L 37/113 137/860 |

OTHER PUBLICATIONS

Definition of "Diaphragm" from Oxford Dictionaries, https://en.oxforddictionaries.com/definition/us/diaphragm, Retrieved Feb. 20, 2018.*

* cited by examiner

*Primary Examiner* — Reinaldo Sanchez-Medina
*Assistant Examiner* — Nicole Gardner
(74) *Attorney, Agent, or Firm* — John Maldjian; Maldjian Law Group LLC (57) ABSTRACT

The diaphragm valve shown in my U.S. Pat. No. 6,615,774 is modified to improve performance by providing multiple overlapping springs to provide increased spring life and different stages of resistance on the diaphragm, a multi-arm housing having holes and tapered edges in each arm to increase air flow, a self seating seal in the housing which contacts the diaphragm, and a diaphragm guide surrounding the guide shaft having lands and spaces about the shaft in capture lubrication and vibration dampening holes surrounding the lands and spaces.

19 Claims, 11 Drawing Sheets

ADJUSTABLE PRESSURE ACTUATED DIAPHRAGM VALVE ASSEMBLY

BACKGROUND OF THE INVENTION

Field of the Invention

The present invention relates to modifications and improvements to the fuel/air regulating device for controlling the incoming fuel/air in piston driven, reciprocating, internal combustion engines disclosed and claimed in my U.S. Pat. No. 6,615,774, issued Sep. 9, 2003.

DESCRIPTION OF THE RELATED ART

As described in my U.S. Pat. No. 6,615,774, the disclosure of which is incorporated by reference herein, a diaphragm valve assembly includes a diffusing screen, and a generally spherical lightweight membrane that provides a 360° circular seal. Spring loading enables variable resistance to be placed on the seal to allow the operator to adjust the internal pressures in an engine by metering the intake and exhaust cycles to obtain maximum performance characteristics from the subject engine.

U.S. Pat. No. 6,561,143 to Holtzman has addressed the air/fuel reversion sealing issue using coil springs with a composite valve. Polimeni, U.S. Pat. No. 7,047,918 also addresses this issue with a curved reed petal.

SUMMARY OF THE INVENTION

The present invention provides an intake valve, which is mounted in the intake manifold of internal combustion engines, between the output of the carburetor and the input of the combustion chamber.

A principal object and advantage of the invention is the provision of an improved intake manifold valve for internal combustion engines which provides longer life and reliability than the device disclosed in my aforementioned patent.

Another object and advantage of the present invention is the provision of a valve having improved airtight sealing between moving parts. Another object and advantage of the present invention is the provision of a seal that resists breakage and is designed to both retained in its sealing position and to return to the sealing provision by contact from the moving diaphragm. Another object and advantage of the present invention is the provision of a valve diaphragm which is light in weight, resilient and dissipates damaging vibration. Another object and advantage of the invention is the provision of integrated spring seats in the diaphragm and on the guide shaft to maintain spring separation. Another object and advantage of the present invention is the provision of redundant secure fastening for the diaphragm and the shaft to enhance safety.

The valve assembly improvements include elimination of the need for the mounting plate of the prior art which is integral with the valve, a self-seating elastomer seal configuration which provides more effective sealing against reversion and shock absorption, a coil over coil spring structure, the addition of another spring to maximize valve output, the enhanced vibration dampening provided by the elastomer seal configuration and the spring structure, and a diaphragm configuration which provides improved vibration resonance dissipation and lubrication gathering functions.

The improved valve assembly of the present invention operates in direct injection engines and with conventional two and four stroke engine designs.

The foregoing, as well as further objects and advantages of the invention will become apparent to those skilled in the art from a review of the following detailed description of my invention, reference being made to the accompanying drawings.

DETAILED DESCRIPTION OF THE PREFERRED EMBODIMENT

In the drawings, the following table sets forth each reference numeral showings:
1 threaded engagement portion
2 flared rim
3 groove
4 holes in support arm
5 support arm
6 integrated washer
7 valve housing
8 base end of shaft and spring capture
9 shaft mounting self-locking nut
10 inner spring
11 boost spring
12 outer spring
13 valve diaphragm
14 guide shaft
15 threaded shaft end
16 anti-resonance holes
17 lands
18 spaces between lands
19 tapered edge
20 threaded hole for shaft
21 diaphragm guide
22 o-ring seal
23 elastomer seal
24 vortex generating outer angled surface of diaphragm
25 graduated surface of diaphragm
26 graduated surface of diaphragm
27 raised contact surface of seal 23

Figure 1:
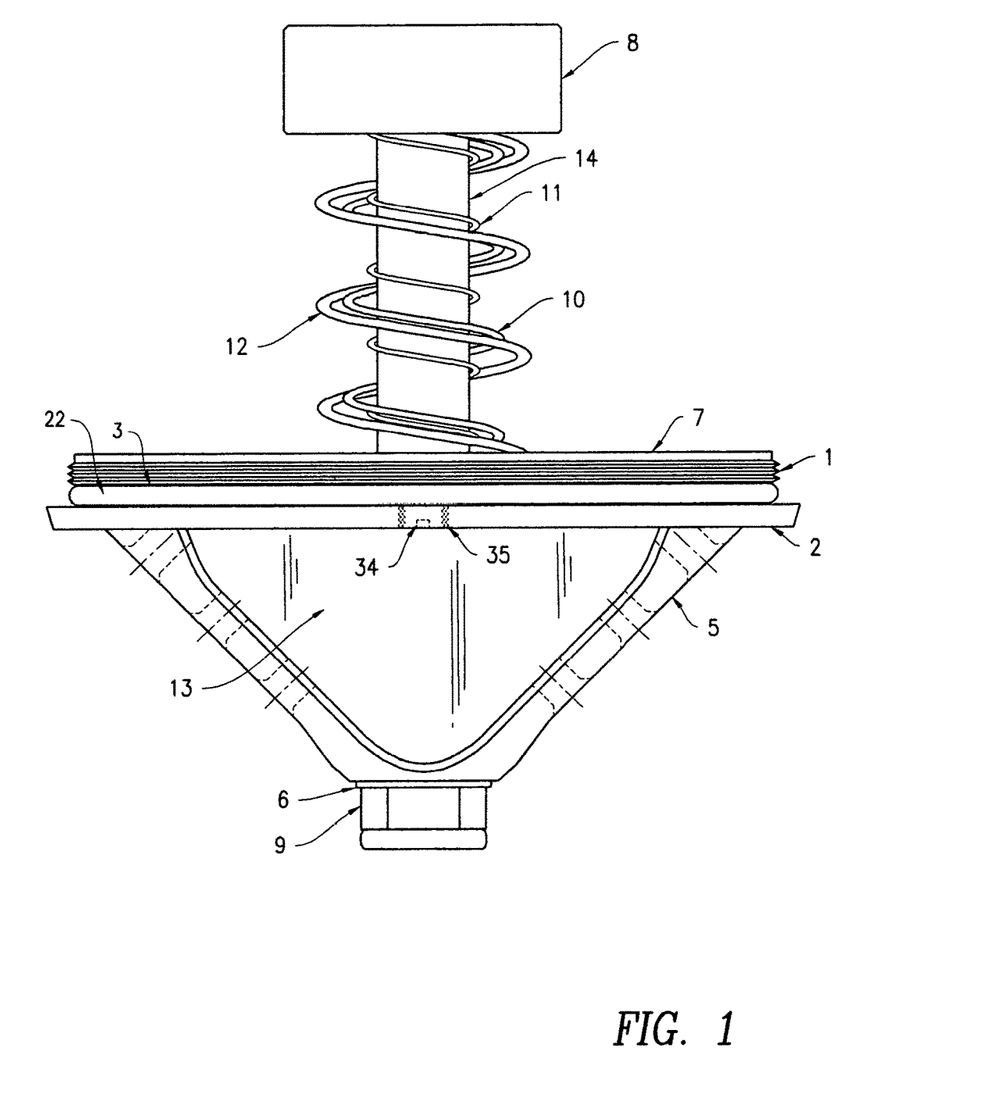
FIG. 1 is a front elevation view of the assembly of the invention.
Figure 2:
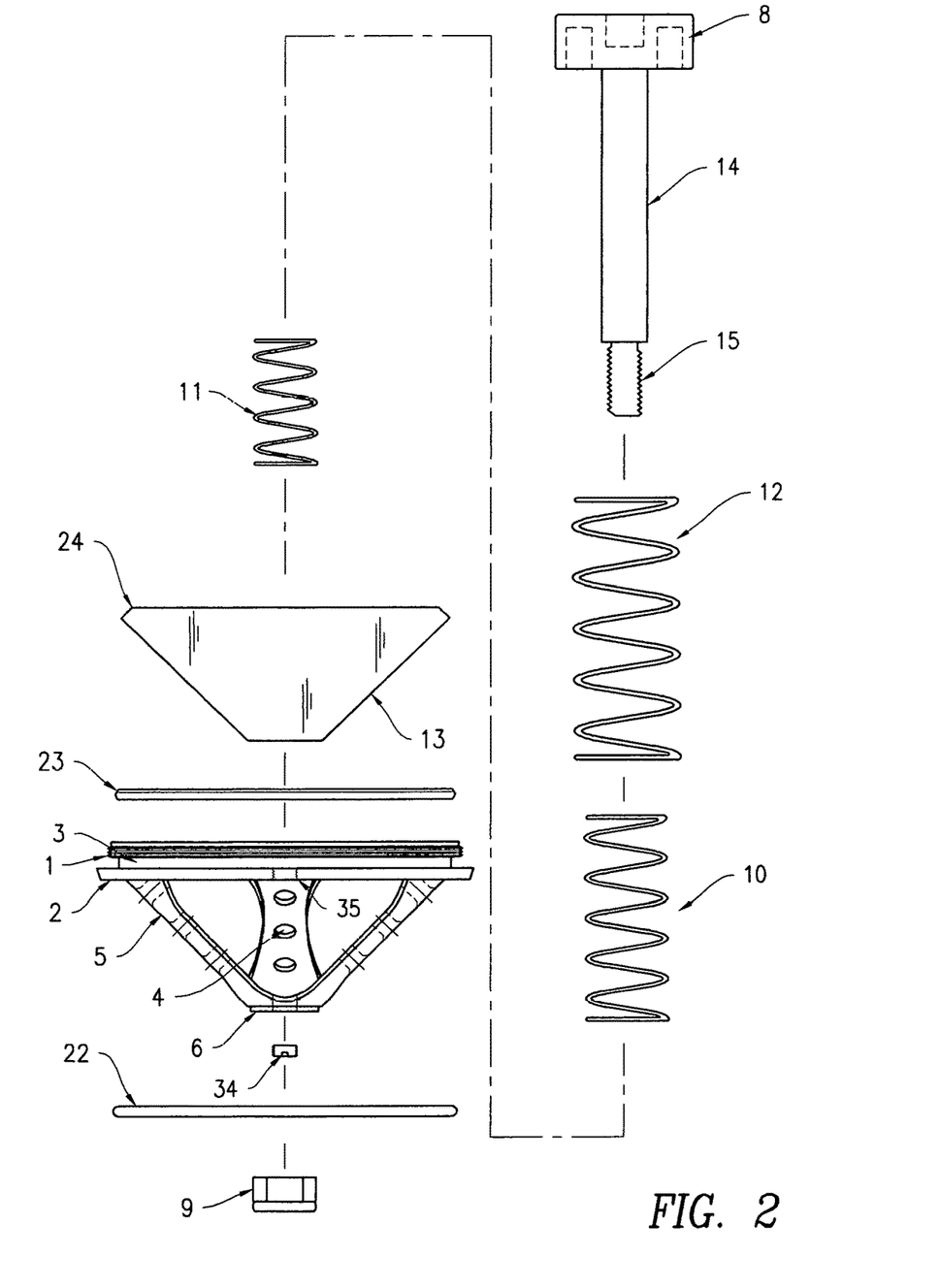
FIG. 2 is an exploded view of components of the assembly of FIG. 1

28 spring capture in shaft base
29 boost spring stop
30 airlock
31 top of valve housing
32 spring capture on diaphragm
33 elastomer seal mounting channel
34 set screw
35 threaded hole for set screw FIG. 1 is an assembly view of the regulating value. FIG. 2 is an exploded view of FIG. 1. With reference to FIGS. 1 and 2, the valve includes a circular valve housing 7.

Figure 11:
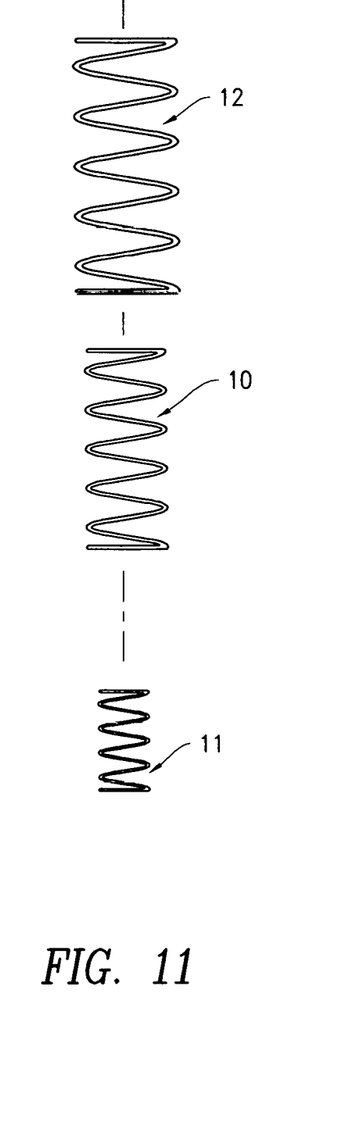
FIG. 11 is an exploded side view of the springs of FIG. 1.
Figure 12:
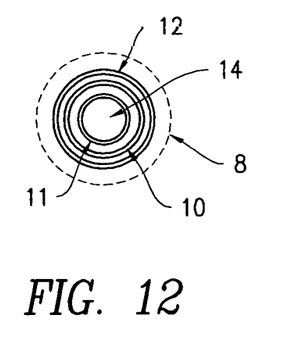
FIG. 12 is a top view of the springs of FIG. 11 showing the coil over coil overlapping configuration.

Valve housing 7 has an outer threaded portion 1 about its circumference to engage the subject motor's mounting provision. Rim 2 has a flared edge with a set screw 34 within its threaded hole 35. Set screw 34 clamps the valve housing 7 to the motor mounting provision. The space 3 between the threaded sections forms a groove for receiving o-ring seal 22 shown in FIG. 6. There are three support arms 5 attached to the valve housing 7. Each of these arms contains holes 4 and tapered edges 19 for improving air flow. The space beneath the arms is conical for receiving valve diaphragm 13. A threaded shaft having base 8, an elongated cylindrical portion 14 and a threaded end portion 15 captures three overlapping springs 10, 11 and 12. The springs 10, 11 and 12 have different diameters permitting one to over fit the other and different lengths as shown in FIGS. 11-12. A self-locking nut 9 secures the guide shaft, springs and diaphragm to the valve housing 7.

Figure 3:
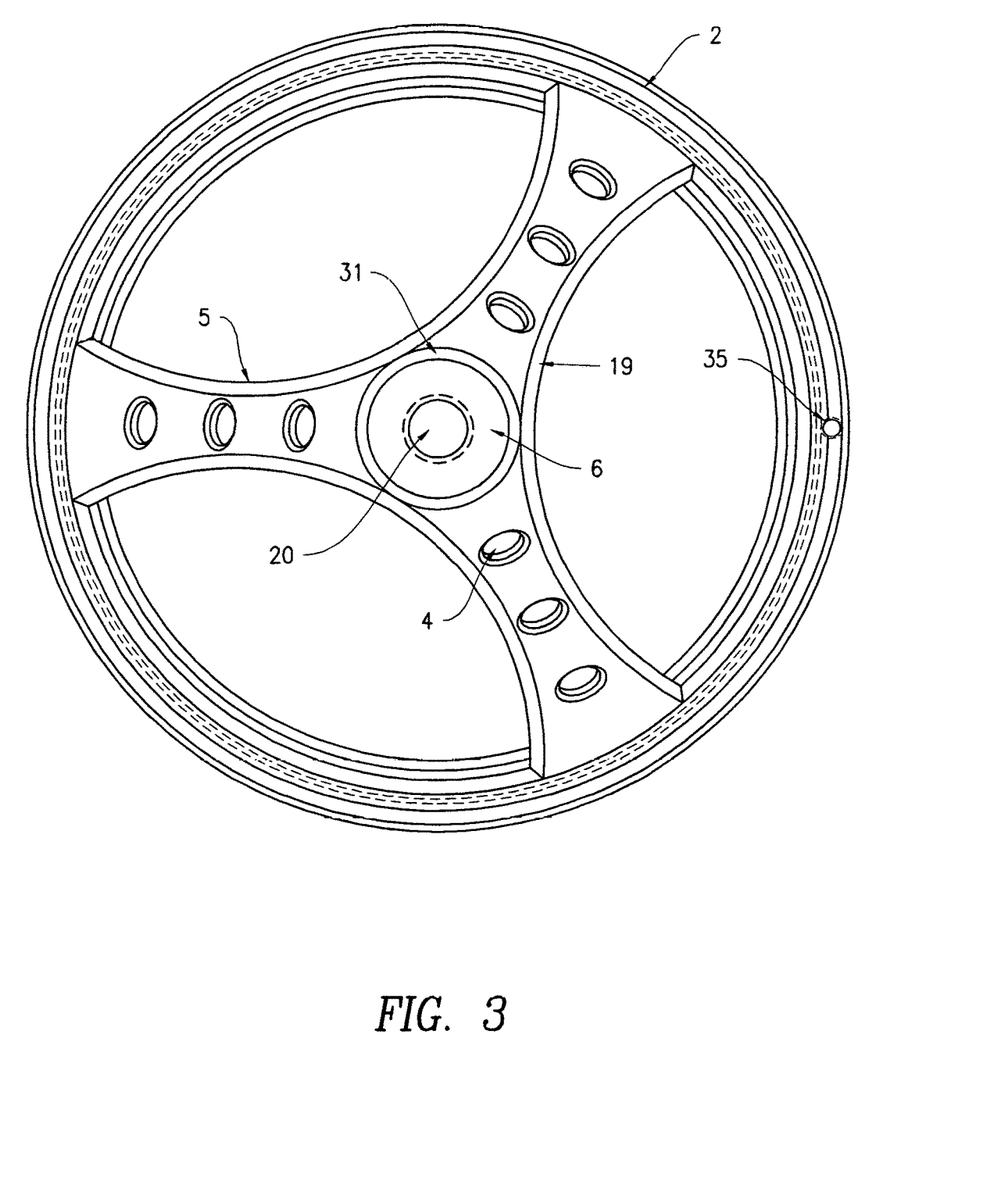
FIG. 3 is a top view of the valve housing of FIG. 1.

As shown in more detail in FIG. 3, a flat top surface 31 is provided where the arms join. The hole 20 in the surface 31 is threaded to receive shaft portion 15 and engage self-locking nut 9.

Figure 4:
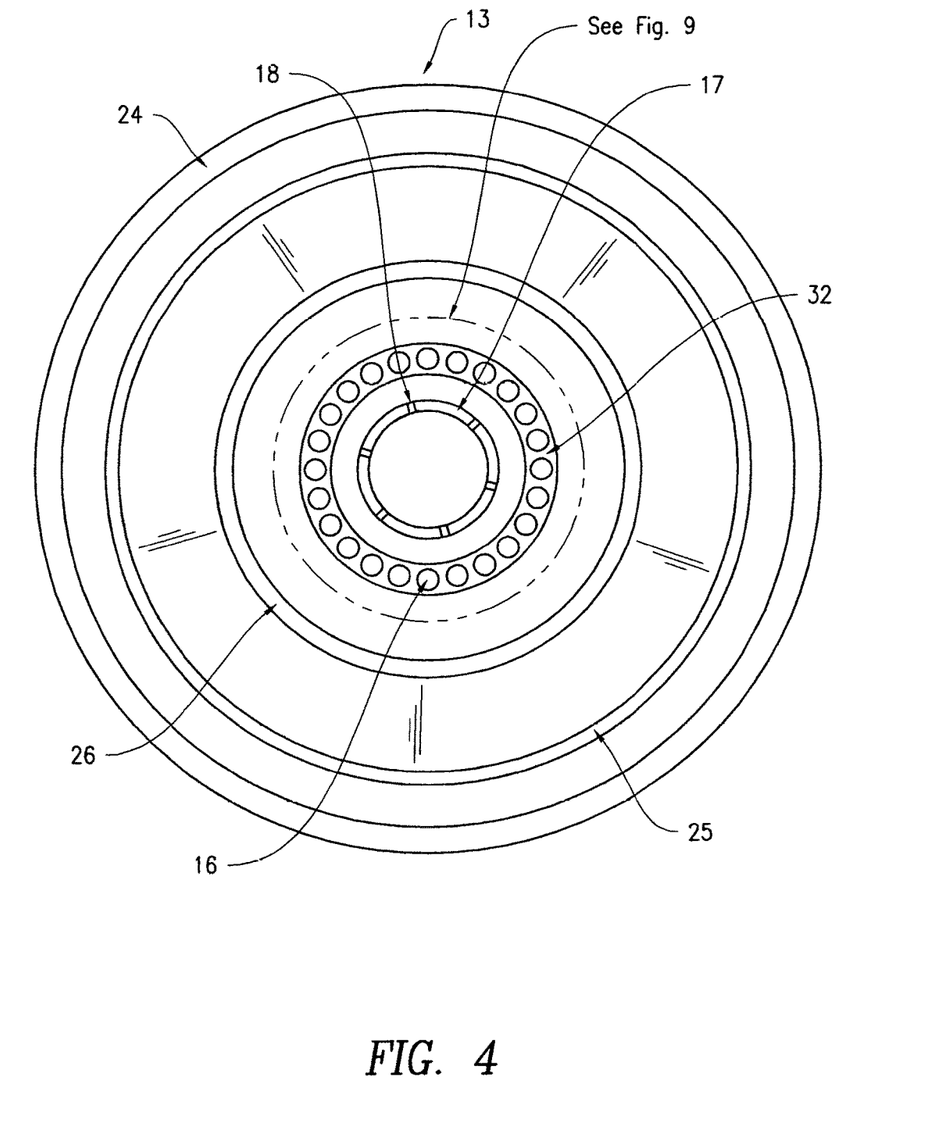
FIG. 4 is a bottom view of the diaphragm 13 shown in FIG. 1.
Figure 7:
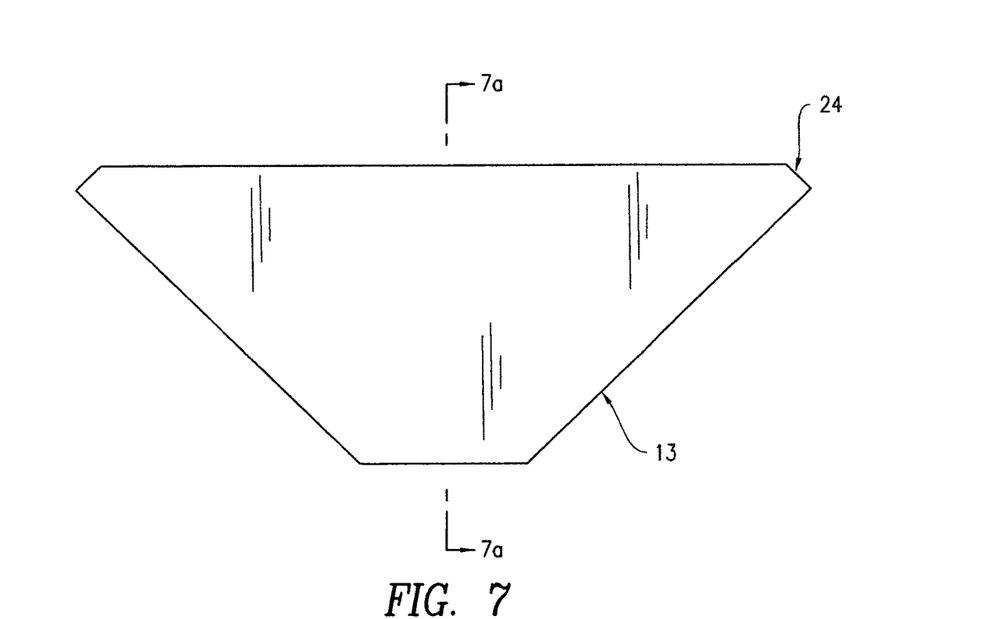
FIG. 7 is a front elevation view of the diaphragm 13 shown in FIG. 1.

FIG. 4 is a bottom view of the diaphragm 13 shown in FIG. 1. As shown therein and in FIGS. 7-7a, there is an outer tapered surface 24 and two inner flat ledge surfaces 25 and 26. Shown in FIG. 9, a plurality of vibration resonance dissipating holes 16 surround a circular configuration of lands 17 and spaces 18 between the lands on diaphragm guide 21. The lands and spaces permit lubrication to gather on the shaft when operating.

Figure 7A:
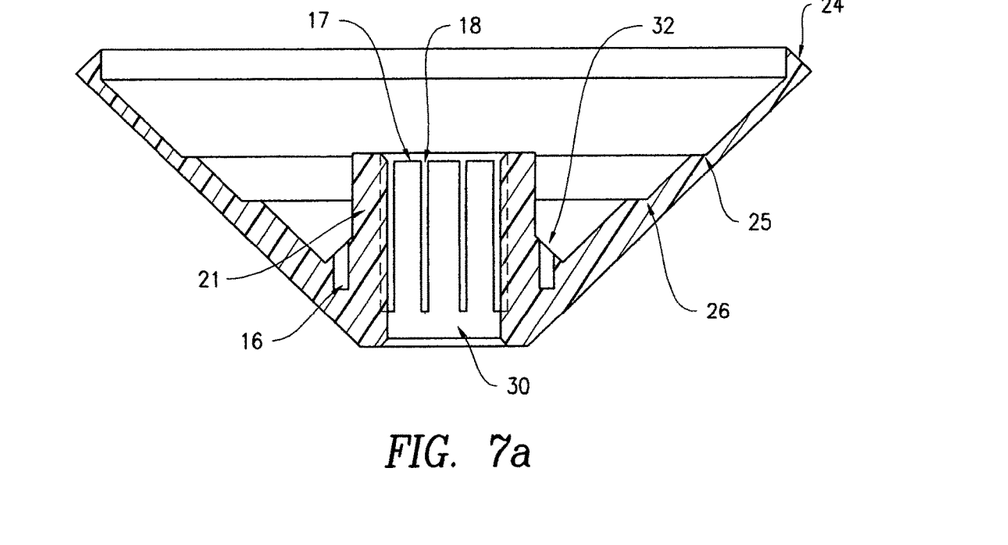
FIG. 7a is a sectional view of the diaphragm taken along the lines 7a-7a of FIG. 7.
Figure 9:
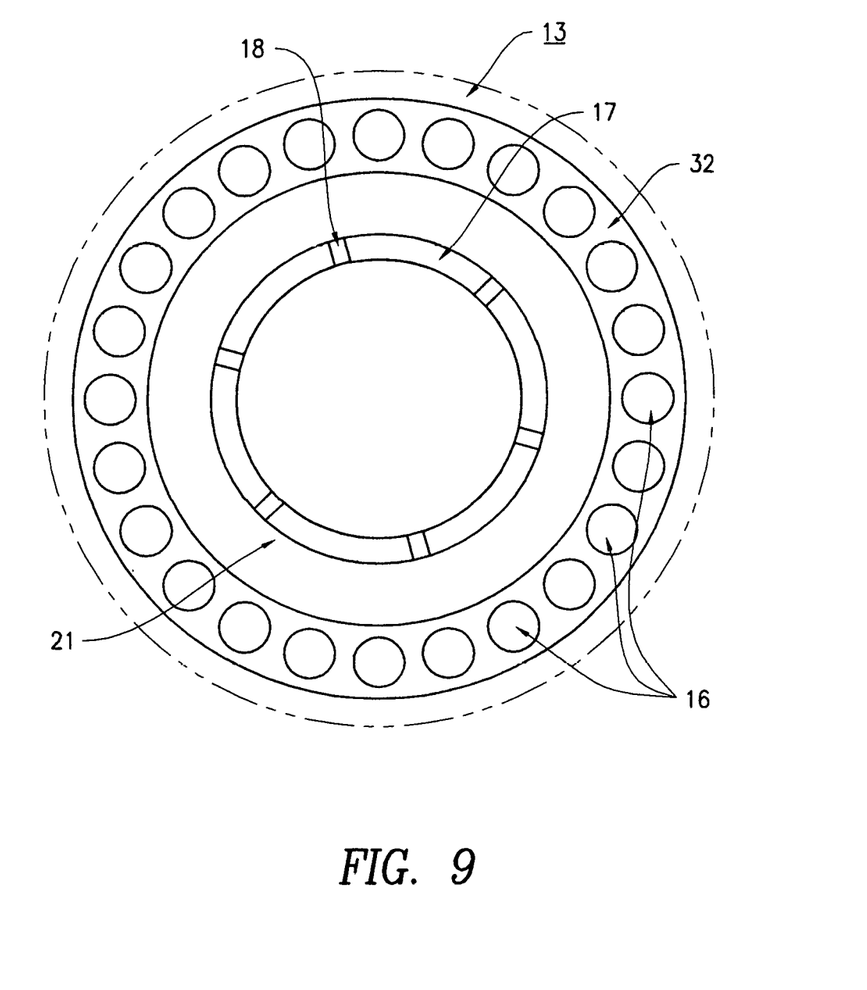
FIG. 9 is an enlarged view of the center portion of the valve diaphragm guide 21 shown In FIGS. 7 and 7A.

Structure 21 in FIGS. 7a and 9 is the diaphragm guide and shows spring capture surfaces 32 (i.e. the spaces between anti-resonance holes 16).

In operation, inner and outer springs 10 and 12 are fully engaged at all times. Only when the subject motor is fully taxed is the shorter boost spring 11 engaged allowing a multi-stage resistance on the diaphragm to increase the velocity of the fuel/air mixture passing through the valve. This multi-spring configuration provides increased spring life.

Figure 5:
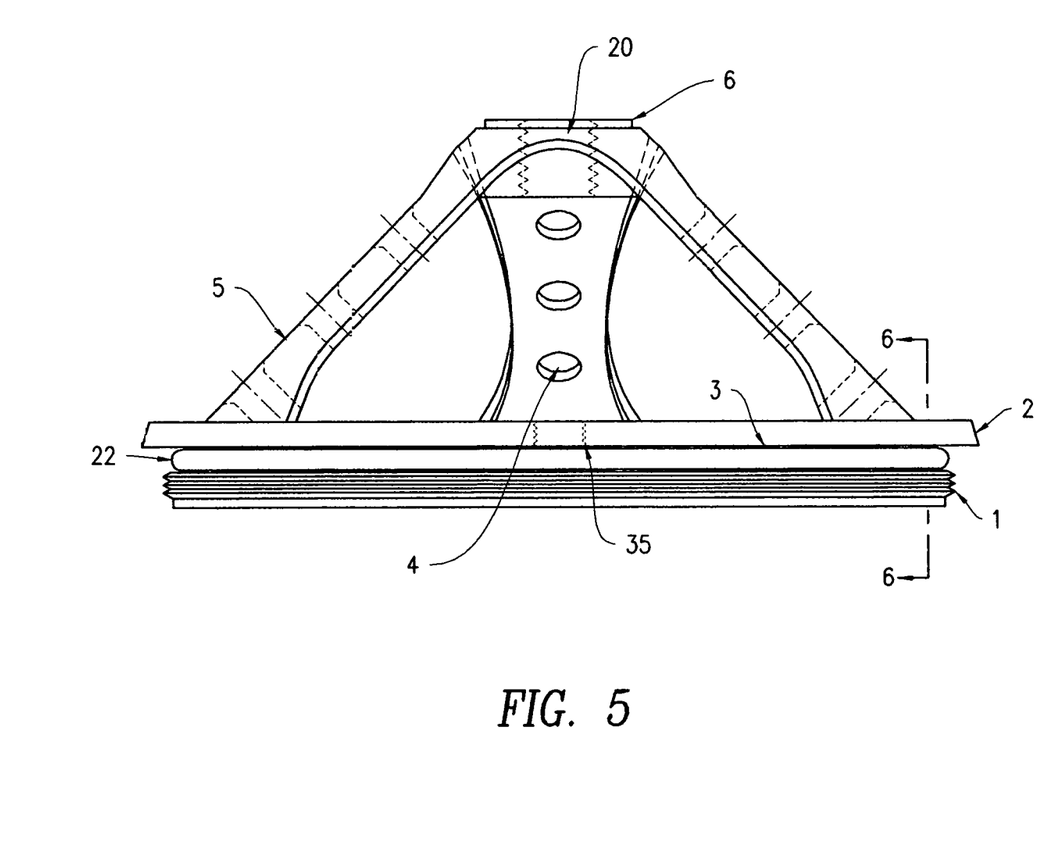
FIG. 5 is a front elevation view of the valve housing of FIG. 1 with o-ring installed.
Figure 6:
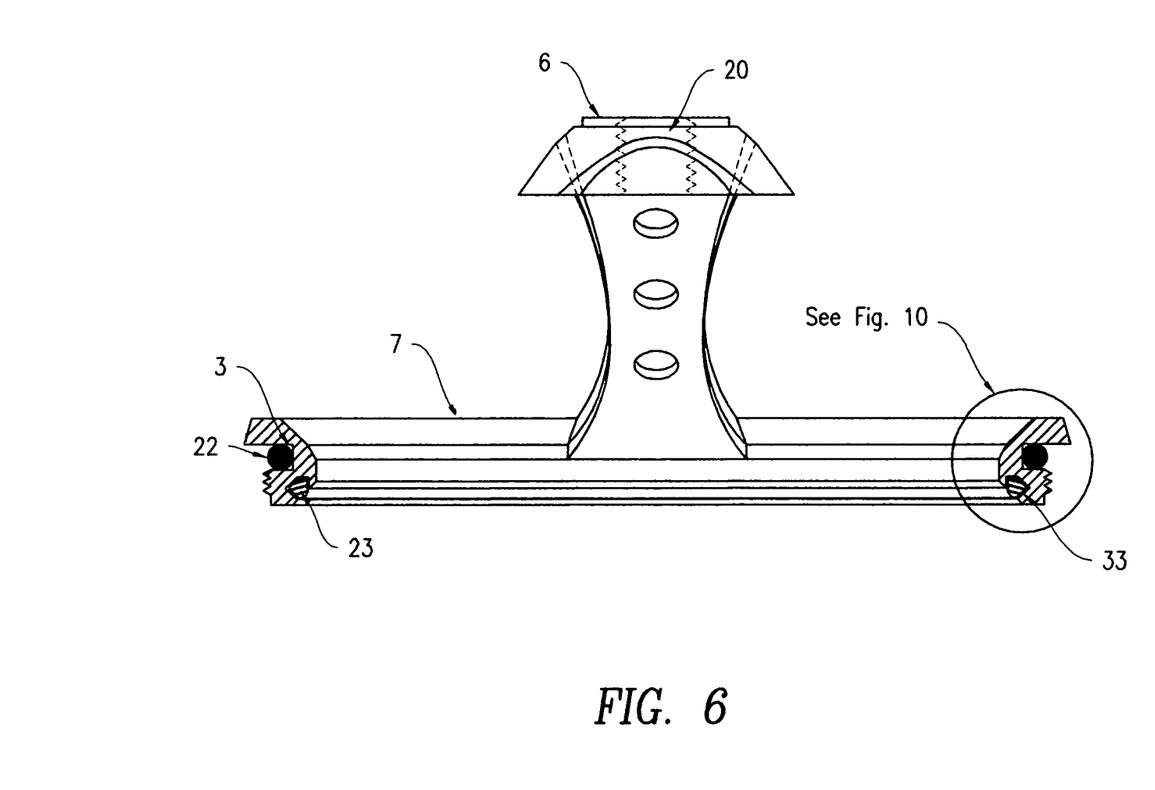
FIG. 6 is a sectional view taken along the lines 6-6 of FIG. 5.
Figure 10:
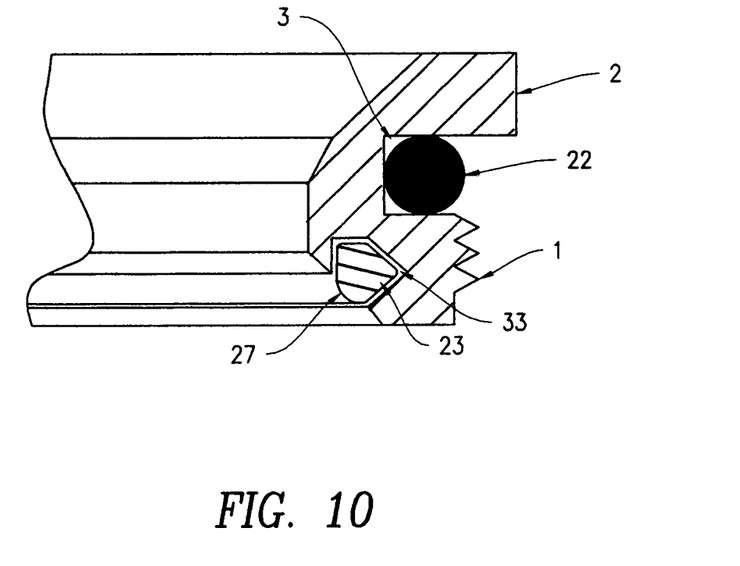
FIG. 10 is a partial sectional view of a portion of FIG. 6.

With reference to FIGS. 5-6 and 10, o-ring seal 22 and elastomer seal 23 are provided in the valve housing 7. O-ring seal 22 shown in cross section (FIG. 6) seats in groove 3. Elastomer seal 23 is specially configured in a channel in valve housing 7 to present a self-seating seal with a raised surface 27 to contact diaphragm 13 providing improved sealing against the subject engine's air/fuel reversion and shock absorption for the rapidly moving diaphragm. The self-seating elastomer seal 23 also provides vibration dampening.

The velocity of the mixture passing over seal 23 can reach over 150 MPH exerting substantial dislodging force on seal 23 so that the contact between the diaphragm 13 and surface 27 serves to frequently reseat seal 23 against the dislodging forces. The seal 23 is also seated by its elastomeric properties and its mounting in channel 33 shown in FIGS. 6 and 10 especially configured to match the configuration of seal 23.

With reference to FIG. 7a, cylindrical space 30 is an air lock providing an integrated air seal for the subject motor while gathering lubrication in spaces 18 for the diaphragm guide 21 on guide shaft 14 during operation.

Figure 8:
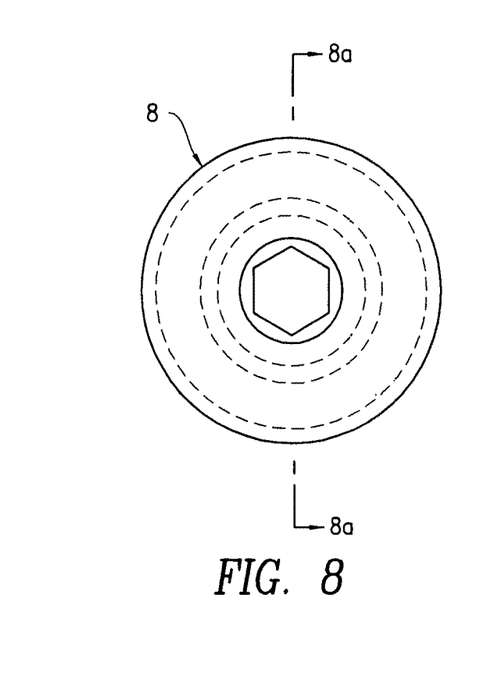
FIG. 8 is a top view of the base of the guide shaft 14 of FIG. 1.
Figure 8A:
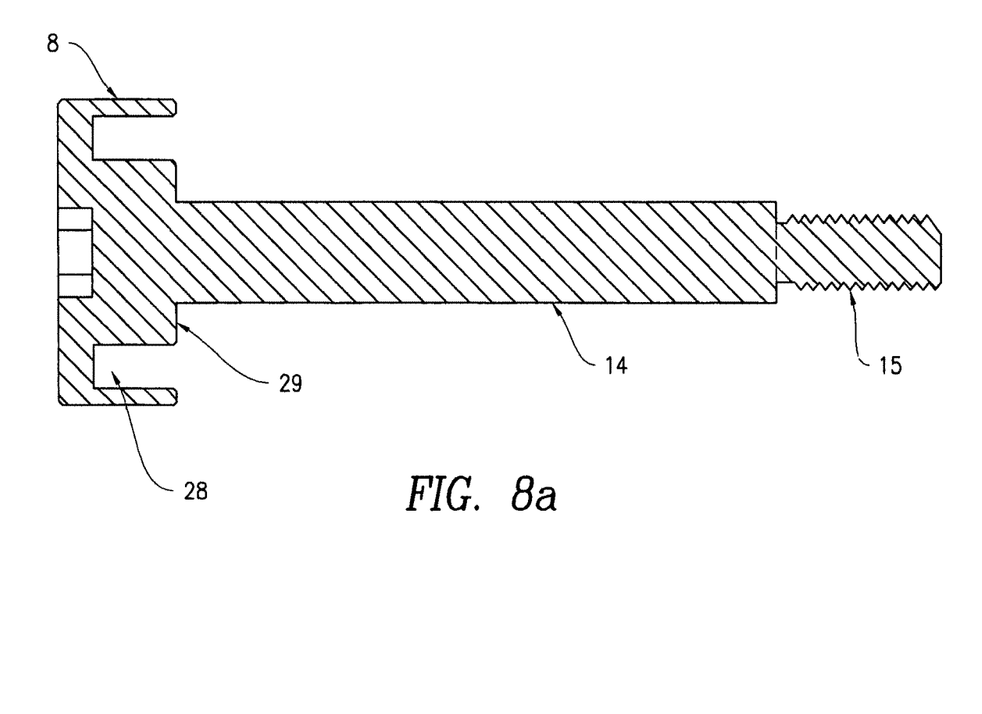
FIG. 8a is a sectional view taken along the lines 8a-8a of FIG. 8.

FIGS. 8 and 8a show detail of the supporting guide shaft 14. A channel 28 in shaft base 8 serves to capture springs 10 and 12. Ledge 29 serves as the boost spring stop. Boost spring 11 floats on and is captured by the guide shaft 14.

FIGS. 11 and 12 show the three overlapping springs 10, 11 and 12.

The valve may be used in small and large engines. In small engines, a single valve is used. When used in larger engines, two or more valves may be used together side by side to handle the increased air flow into the cylinder.

Having thus described this invention in detail, it is to be understood that the foregoing description is not intended to limit the spirit and scope thereof. What is desired to be protected by Letters Patent is set forth in the appended claims.

I claim:

1. A valve assembly for an internal combustion engine, comprising:
   a valve housing comprising a rim having a threaded portion for mounting in an engine;
   a diaphragm having a diaphragm guide, said diaphragm is seated along its entire circumference against a portion of said valve housing when said diaphragm is in its closed position and unseated along its entire circumference from said portion of said valve housing when said diaphragm is in its open position;
   a guide shaft having a base end, said shaft is fixedly connected to said valve housing and said diaphragm guide is movably connected to and is movable along the guide shaft; and
   a plurality of overlapping springs having a first end and an opposite second end mounted on said shaft, the first end is in contact with the base end and the second end is in contact with the diaphragm guide, said springs providing different stages of resistance on said diaphragm to increase velocity of fuel/air mixture passing through a valve;
   a rim having
      an outer perimeter including a threaded portion attachable to an engine, a flared portion and a groove separating the threaded portion and the flared portion, wherein the groove is sealable with at least an o-ring seal, and
      an inner perimeter including a channel, formed in proximity to said threaded portion and that accepts at least a self-seating seal having a raised surface that contacts said diaphragm thereby sealing the diaphragm against air/fuel reversion, vibration dampening and shock absorption,
   wherein the valve housing further comprises a set screw securing said valve assembly to an engine.

2. A valve assembly for an internal combustion engine, comprising:
   a valve housing;
   a diaphragm having a diaphragm guide, said diaphragm is seated along its entire circumference against a portion of said valve housing when said diaphragm is in its closed position and unseated along its entire circumference from said portion of said valve housing when said diaphragm is in its open position; and a guide shaft having a base end, said shaft is fixedly connected to said valve housing and said diaphragm guide is movably connected to and is movable along the guide shaft;

wherein said diaphragm guide includes an elongated circular shape, a plurality of holes formed thereon to dissipate vibrations and a plurality of lands and spaces between said lands, said lands and spaces permitting lubrication of said guide shaft.

3. The valve assembly of claim 2, wherein the diaphragm further comprises a cylindrical airlock connecting said lands and providing an air seal for an engine.

4. The valve assembly of claim 2, wherein the valve housing further comprises a set screw securing said valve assembly to an engine.

5. The valve assembly of claim 2, wherein the valve housing further comprises:

a rim having
   an outer perimeter including a threaded portion for mounting in an engine, a flared portion and a groove, sealable with at least an o-ring seal, separating the threaded portion and the flared portion, and
   an inner perimeter including a channel formed in proximity to said threaded portion and receiving at least a self-seating seal having a raised surface that contacts said diaphragm thereby sealing the diaphragm against air/fuel reversion, vibration dampening and shock absorption.

6. A valve assembly for an internal combustion engine comprising:

a valve housing;

a diaphragm having a diaphragm guide, said diaphragm is seated along its entire circumference against a portion of said valve housing when said diaphragm is in its closed position and unseated, along its entire circumference, from said portion of said valve housing when said diaphragm is in its open position wherein the diaphragm guide includes a plurality of vibration resonance dissipating holes formed thereon and a plurality of lands and spaces between the lands formed therein;

a guide shaft having a base end, said shaft is fixedly connected to said valve housing, and said diaphragm guide is movably connected to and is movable along the guide shaft, a plurality of overlapping springs having a first end and an opposite second end mounted on said guide shaft, the first end is in contact with the base end and the second end is in contact with the diaphragm guide, said springs providing different stages of resistance on said diaphragm to increase velocity of fuel/air mixture passing through a valve, wherein said lands and spaces permitting lubrication of said guide shaft.

7. The valve assembly of claim 6, wherein the valve housing further comprises a rim having an outer perimeter including a threaded portion attachable to an engine, a flared portion and a groove separating the threaded portion and the flared portion, wherein the groove is sealable with at least an o-ring seal, and an inner perimeter including a channel, formed in proximity to said threaded portion and that accepts at least a self-seating seal having a raised surface that contacts said diaphragm thereby sealing the diaphragm against air/fuel reversion, vibration dampening and shock absorption.

8. The valve assembly of claim 6, further comprising a cylindrical airlock connecting said lands and providing an air seal for said engine while lubricating the guide shaft.

9. The valve assembly of claim 6, wherein at least one of the plurality of springs is engaged only when the engine is fully taxed.

10. The valve assembly of claim 6, wherein the valve housing further comprises:

a rim having
   an outer perimeter including a threaded portion attachable to an engine, a flared portion and a groove separating the threaded portion and the flared portion, wherein the groove is sealable with at least an o-ring seal, and
   an inner perimeter including a channel that accepts at least self-seating seal with a raised surface that contacts said diaphragm thereby sealing the diaphragm against air/fuel reversion, vibration dampening and shock absorption;

a threaded integrated washer; and a plurality of support arms connecting the rim and the threaded integrated washer.

11. A valve assembly for an internal combustion engine, comprising:

a valve housing;

a diaphragm having a diaphragm guide said diaphragm is seated, along its entire circumference against a portion of said valve housing when said diaphragm is in its closed position and unseated along its entire circumference from said portion of said valve housing when said diaphragm is in its open position; and a guide shaft having a base end, said shaft is fixedly connected to said valve housing and said diaphragm guide is movably connected to and is movable along the guide shaft, wherein said diaphragm guide comprises an elongated circular shape, a plurality of openings formed therein for dissipating vibration resonance and lubricating the guide shaft.

12. The valve assembly of claim 11, wherein the valve housing further comprises:

a rim having
   an outer perimeter including a threaded portion for mounting in an engine, a flared portion and a groove, sealable with at least an o-ring seal, separating the threaded portion and the flared portion, and
   an inner perimeter including a channel formed in proximity to said threaded portion and receiving at least a self-seating seal having a raised surface that contacts said diaphragm thereby sealing the diaphragm against air/fuel reversion, vibration dampening and shock absorption;

a threaded integrated washer facing the rim; and a plurality of support arms connecting the rim and the threaded integrated washer.

13. The valve assembly of claim 12, wherein the guide shaft comprises a base end and a threaded end coupled to the threaded integrated washer.

14. The valve assembly of claim 11, wherein the valve housing further comprises:

a rim having
   an outer perimeter including a threaded portion attachable to an engine, a flared portion and a groove separating the threaded portion and the flared portion, wherein the groove is sealable with at least an o-ring seal, and an inner perimeter including a channel that accepts at least self-seating seal with a raised surface that contacts said diaphragm thereby sealing the diaphragm against air/fuel reversion, vibration dampening and shock absorption.

15. At least one valve assembly for an internal combustion engine, each valve assembly comprising:
 a valve housing;
 a diaphragm including a diaphragm guide having a circular shape and a plurality of vibration resonance dissipating holes formed thereon that causes dampening of vibrations, said diaphragm is seated along its entire circumference against a portion of said valve housing when said diaphragm is in its closed position and unseated along its entire circumference from said portion of said valve housing when said diaphragm is in its open position, wherein the diaphragm is in contact with a raised surface of a seal which reseats the seal;
 a guide shaft having a base end, said shaft is fixedly connected to said valve housing, and said diaphragm guide is movably connected to and is movable along the guide shaft; and
 a plurality of overlapping springs having a first end and an opposite second end mounted on said guide shaft, the first end is in contact with the base end and the second end is in contact with the diaphragm guide, said springs having different resistance on said diaphragm.

16. The valve assembly of claim 15, wherein at least one of the plurality of springs is engaged only when the engine is fully taxed.

17. The valve assembly of claim 15, wherein the at least one valve housing comprises two or more valve housings mounted side by side to handle increased air flow.

18. The valve assembly of claim 15, wherein the valve housing further comprises:
 a rim having
  an outer perimeter including a threaded portion attachable to an engine, a flared portion and a groove separating the threaded portion and the flared portion, wherein the groove is sealable with at least an o-ring seal, and
  an inner perimeter including a channel that accepts at least a self-seating seal having a raised surface; and
 a plurality of support arms connecting the flared portion of the rim and a threaded integrated washer.

19. The valve assembly of claim 18, wherein the diaphragm guide comprises
 a plurality of lands and spaces between the lands formed therein,
 wherein the seal contacts the diaphragm thereby sealing the diaphragm against air/fuel reversion, vibration dampening and shock absorption.

* * * * *